March 28, 1967 S. W. WARD 3,311,010

SELF-CONTAINED AUDIO AMPLIFIED MUSICAL INSTRUMENT

Filed June 10, 1964 2 Sheets-Sheet 1

INVENTOR.
SAMUEL W. WARD
BY Kenneth E. Merklen
ATTORNEY

March 28, 1967 S. W. WARD 3,311,010

SELF-CONTAINED AUDIO AMPLIFIED MUSICAL INSTRUMENT

Filed June 10, 1964 2 Sheets-Sheet 2

INVENTOR.
SAMUEL W. WARD
BY Kenneth E. Merklen
ATTORNEY 3,311,010

SELF-CONTAINED AUDIO AMPLIFIED MUSICAL INSTRUMENT

Samuel W. Ward, 7 Old Albany Post Road, Ossining, N.Y. 10562

Filed June 10, 1964, Ser. No. 373,933
6 Claims. (Cl. 84—376)

Figure 1:
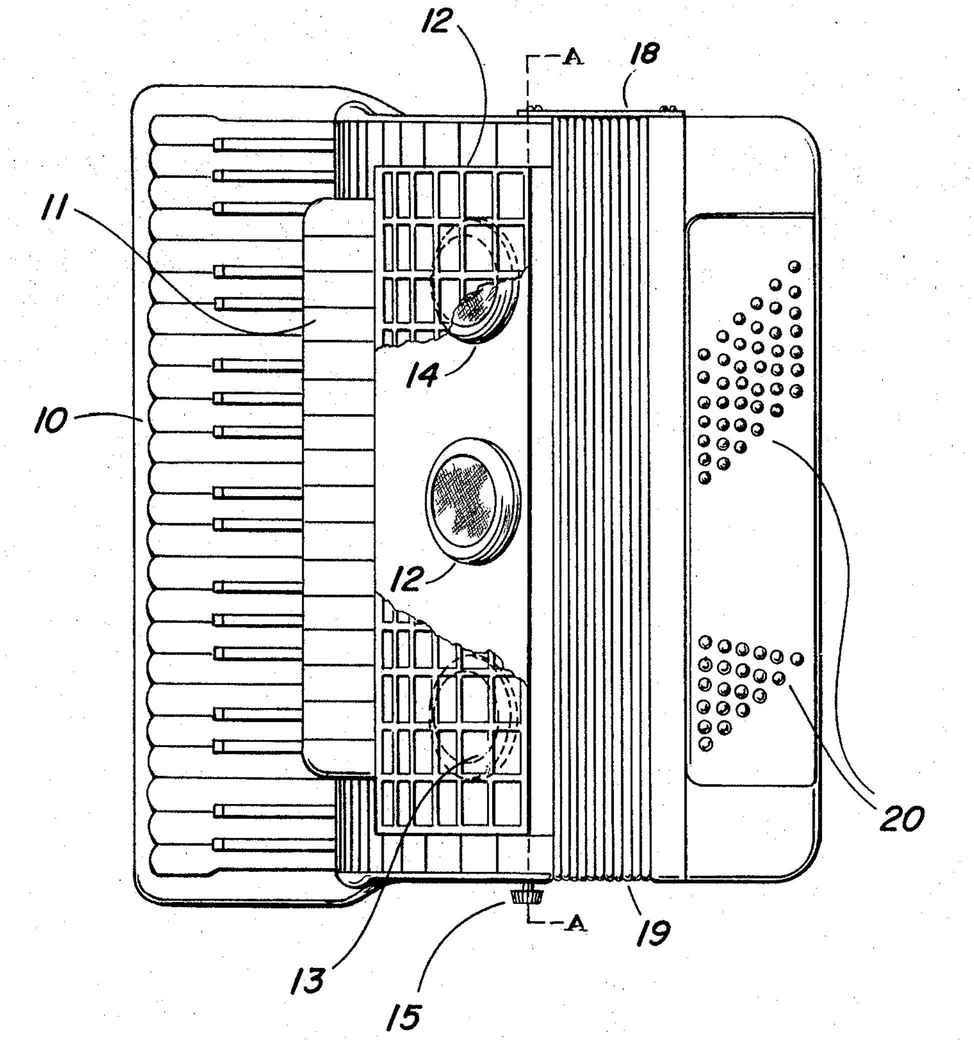

The present invention relates to an improvement in audio amplification of the audio output of a portable musical instrument. More particularly the invention relates to an audio amplifier for use in association with an accordian, for example, in which the audio amplifier is contained within the instrument with loud speakers mounted in the decorated grill, covering the tone outlets so as to conform with the decoration and styling of the grill, and the remainder of the audio amplifier components contained in the interior of the instrument.

Up to the present time audio amplifiers have been provided for musical instruments, such as accordians, however the amplifier itself and the speakers have been external to the accordian with plug-connection from the audio amplifier components made to a transducer or microphone pick-up located in the interior of the instrument. Some audio amplifier systems provide several microphones so as to avoid against a dominant tone or small group of tones predominating over the other tones more remotely produced from the position of the pick-up.

The system of an auxiliary audio amplifier serves its purpose but is cumbersome and generally requires a external current source, such as obtainable from an outlet found in a structure or building. Battery operation of such amplifiers is not too practical. Further, the size of the audio amplifier components limits the portability of the instrument and use of such total apparatus in, for example, a marching band, which uses the accordian as one of its instruments, is not practical.

My invention provides for the incorporation of one broad band or, two or more limited band audio amplifier systems in an accordian. The interior of an accordian has sufficient space to house one or several small size component audio amplifiers, as well as several microphones or pick-ups and space for mounting a replaceable dry cell battery of sufficient power to drive the audio amplifier system for as many as four hours or more, of continuous usage.

One arrangement of my invention provides for a transistorized audio amplifier having a band of audio frequency response sufficient to amplify the full frequency range of the audio frequencies produced by an accordian. The pick-up or microphone is so located within the interior of the instrument so as to use the frame of the instrument as a sounding board and thereby pick-up the full audio range of the instrument.

Since the amplifier is of solid state components, which may be low voltage devices, a relatively small dry cell has been found to drive the amplifier satisfactorily for sufficient time to justify its effective usage. Access to the interior of the instrument is made simple by the construction of the instrument since the bellows section is easily removed from the frame of the sides of the instrument. This easy access makes replacement or changing of the dry cell a simple matter, when the dry cell is clip-mounted on the interior wall of the instrument, in the bellows sections. The microphone connection to the amplifier presents no problem since I have mounted the microphone on the common wall adjacent to the frame, which frame serves as a sounding board for the tones produced by the accordian. The speakers are mounted on or under the external grill covering the tone outlets, with connection to the amplifier circuit through the common wall. An on-off switch and incorporated volume control may be located on the interior of the instrument, with a knob adjustment or control extending to the exterior of the instrument through the frame. This permits external control of the audio amplifier system or systems.

Another arrangement of my invention provides for two or more limited band audio frequency amplifiers in which the upper frequency response of the low band audio frequency amplifier system overlaps the lower frequency response of the high band audio frequency amplifier system, with individual on/off and volume control of each system and separate speakers and microphones or pickups, so as to provide a stereo-effect of the sounds of the instrument as well as individual audio channel control.

In the latter arrangement limited audio frequency response microphones and limited frequency response speakers may be used, each compatible with the band width of the electronic circuitry of the amplifier with which each is associated.

Very small element solid-state amplifier circuits are commercially available, which may be driven by a compact power source, such as a dry cell. The size of the circuit of the amplifier and the power source lends itself for installation within the interior of an accordian and the weight of the components is negligible.

Through the use of such compact, internally located amplifier system or systems I have provided an accordian with an audio amplification system in which the increase weight factor and equipment bulk has practically been eliminated. The amplifier system carried within the instrument provides for a completely portable audio amplified instrument with its own power source.

My invention of a fully integrated audio amplified musical instrument, such as an accordian has several advantages. The actual labor of the musician is reduced since to increase the amplitude in an unamplified accordian the bellows must be pumped more rapidly. This is increased strain on the musician member of a marching band, for example. My integrated audio amplified accordian relives the musician from this increased strain. Further the integrated instrument avoids the use of external connection to an externally located amplifier and eliminates the danger of accident from tripping on the connecting cable. Through the use of multi-channel control over a plurality of overlapping audio ranges, adjustable tone compensation of the instrument is provided at various audio frequency levels thereby providing a musical instrument with more balanced tone output. This latter function operates to relieve the musical of the stress of pushing and/or pulling harder on the bellows of the instrument to produce the tonal effect which may now be provided through electronic control.

Since an accordian operates on the principle of forcing air through sound or tone valves, the various wires passing through the wall of the instrument need be sealed in some fashion. This may be provided for by use of a tight fitting grommet or other sealing component or device.

It is a principal object of the present invention to provide a portable musical instrument with a self contained audio amplifier system.

Another object is to provide an amplifier for an accordian that is substantially fully integrated within the accordian which does not noticeably increase the weight of the accordian.

A further object is to provide an accordian with a self contained, multi-stage audio amplifier system in which the various frequency sound levels may be adjustably controlled.

Figure 2:
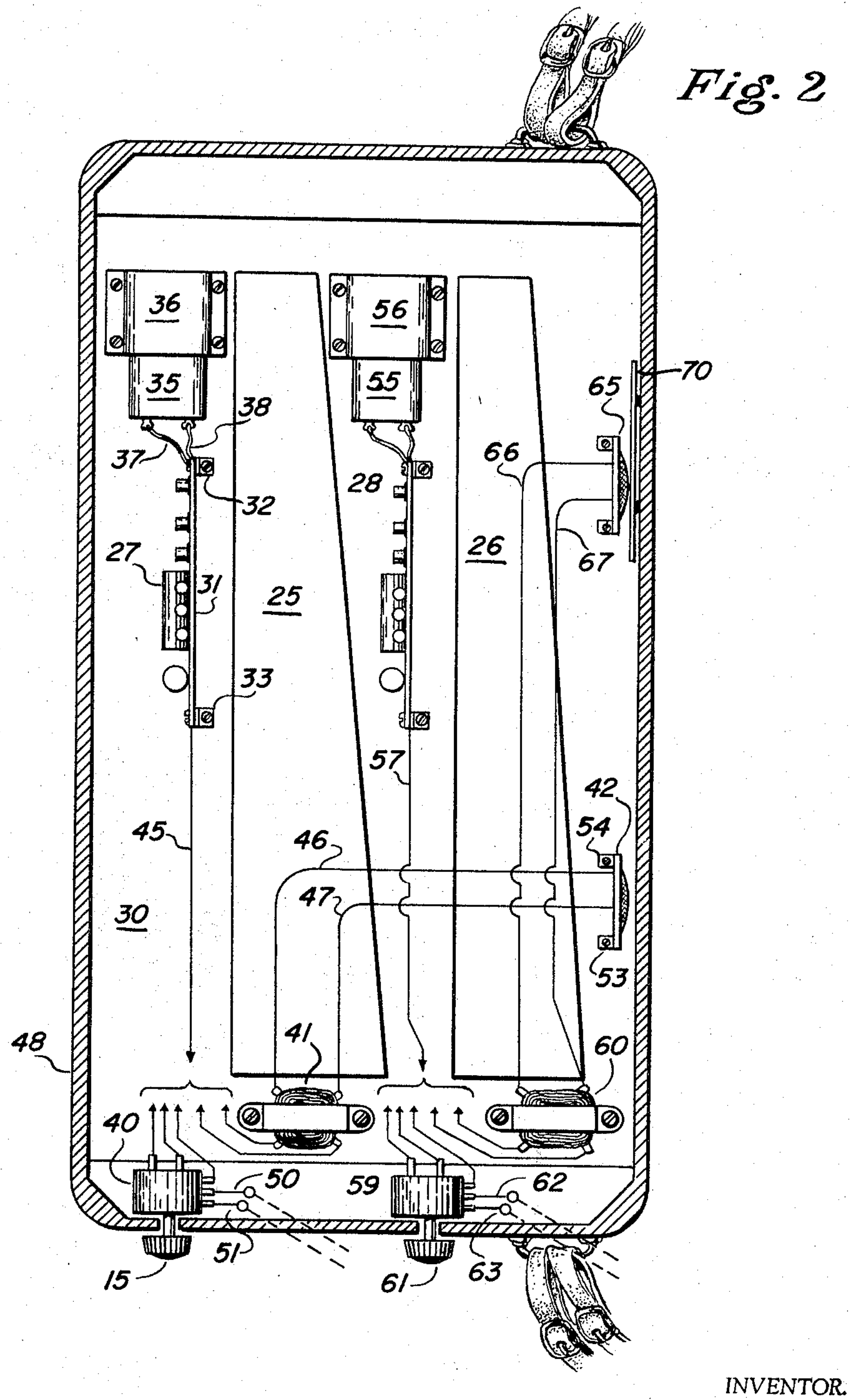

These and other objects will become apparent from reading the following description with reference to the accompanying drawings in which:

FIG. 1 shows graphically an accordian with part of the grill covering the tone valves cut away so as to show the speakers mounted under the grill and FIG. 2 shows, in partly graphical form, some of the components of an integrated audio amplifier system for an accordian mounted on the tone valve supporting plate of the accordian.

Referring to FIG. 1, a graphic view of an accordian with the grill of the accordian partly cut away so as to expose the center positioned speaker and part of the upper speaker, which are mounted under the grill, is shown.

A key board 10 is illustrated, with the "stops" 11 above the key board and below the grill 12. The grill 12 which may have any ornamented form, normally covers the tone valves. Beneath the grill, illustrated in broken line form, is the lower speaker 13. The center speaker 12 is shown in solid line form in the cut-out section of the grill and the upper speaker 14 is shown partly in broken line and partly in solid line form.

The speakers may be mounted under the grill in any of several ways. The speakers may be mounted on the interior of the grill itself or on a frame work between the grill and tone valve mounting wall. I have found there is sufficient room between the grill and the walled section which supports the tone valves (the other side of the wall shown in FIG. 2) so that normal stand-offs may be used in which to mount the speakers on such wall.

As is well known the speakers of an audio amplifier are preferably balanced, each having a common impedance value, when more than one speaker is connected to a common amplifier.

Where only one internal amplifier is employed one speaker, or two, may be used, if desired.

The wire connecting the speakers to the amplifier circuitry through a potentiometer are not shown.

The knob 15 of one potentiometer is shown at the bottom of the accordian. The second knob of the second potentiometer is hidden from view behind knob 15.

FIG. 2 is an inside view along the line A—A of FIG. 1.

The accordian is illustrated in a closed position as indicated by the locking-strap 18, the bellows 19 being held together. The carrying straps have not been shown in FIG. 1 for convenience of illustration, however such straps form a harness which supports the accordian from the shoulders of the musician and are partly illustrated in FIG. 2.

The buttons 20 represent the base tone actuators, which are operated by the musician. The actuating strap which the musician uses to pass his arm through so as to couple his arm to the movable section of the instrument and expand the bellows when the locking strap 18 is open and he is playing the accordian, is not shown.

Referring to FIG. 2, the interior of the accordian through line A—A is shown, with the amplifiers and transducers shown in graphic form. The valve section or reeds are represented as two rectangular, non-parallel blocks, 25 and 26. The details of such sections are not shown for convenience of illustration.

Two printed-circuit mounted amplifiers 27 and 28 are shown, each of which include at least three transistors, several small resistors and several capacitors.

An amplifier circuit that may be used for the present purpose may be seen, in circuit form, in the G.E. Transistor Manual, Sixth Edition, Copyrighted 1962 by the General Electric Company. In particular, page 123 shows the circuit of a four-transistor, audio amplifier driven by a 9 volt, direct current source.

In practicing my invention an audio amplifier, such as shown in the G.E. Transistor Manual, on page 123 may be mounted on a printed circuit board sufficiently small so as to be mountable on the wall 30.

For example, the audio amplifier 27 could be such circuit; although three transistors are shown, a fourth transistor may be hidden from view. The printed circuit board 31 may be mounted on wall 30 by the L shaped brackets 32 and 33.

A small battery 35 illustrates a nine volt battery, for example, that may be mounted in a bracket 36, also mounted on wall 30. Sufficient pressure may be applied, by the bracket or clamp, to the battery to secure the battery in a constant desired position so that the leads 37 and 38 do not become disconnected from the terminals.

The audio amplifier 27 also includes the components of potentiometer 40 and transformer 41, along with the microphone or transducer 42.

Line 45 represents a plurality of leads tied into a harness connecting the leads from the potentiometer 40 and from the transformer 41 to the components on the printed circuit board.

Leads 46 and 47 connect the transducer 42 to the transformer 41. In practice, the various leads would be neatly formed to circumvent the reed or valve sections, but are illustrated crossing over the valve sections, for convenience of illustration.

The potentiometer 40 is mounted in the frame 48, with a leak-proof washer grommet. The knob 15 is mounted at the external end of shaft passing through the frame 48.

The potentiometer 40 serves as an on/off switch and volume control, which is manually operable.

The leads 50 and 51 pass through the wall 30 and would connect with one or more of the speakers, shown in FIG. 1. These leads would also be made leak-proof at the wall 30.

Transformer 41 is mounted on the wall 30 by the use of screws and nuts. The use of nylon or other plastic screws is suggested since this type of material in screws and/or nuts is substantially self-sealing. However, a resilient washer may also serve for sealing the holes through which the screws are passed. The microphone 42 is mounted in close proximity to the frame 48 by use of L shaped brackets 53 and 54. By mounting the microphone in this position the frame 48 serves as a sounding board or sonic reflector so that there is a more even distribution of sound picked up by the microphone.

In practicing my invention I find that the frame 48 provided sufficient sound reflection of the full tone range of the accordian so as to provide a sounding board effect. However, it may be desirable to mount a thin sound box 70 in FIG. 2, on the frame 48. Such thin sound box would preferably be made of very thin wood and be hollow having an interior dimension of from ⅜ to ¼ inch. The sound box may be mounted by the use of small stand-offs so as to be raised ⅛ to $\frac{3}{16}$ of an inch above the frame 48. The ends of the sound box could be open, if desired. The length of the sound box may approximate one half the length of the long dimension of the frame 48 and the width of the sound box may be substantially 1 to 1½ inches. Such a sound box may provide somewhat more sound reflection than the frame itself. I find it unnecessary to employ such sound box but such component could be added if desired. When using a wooden sound box the microphone would be mounted adjacent to the broad surface of the box so as to pick up the vibrations of the surface.

A sound box of this type would be used more to gather and reflect the higher tones of the instrument than the lower tones. However, the actual size of the sound box would be limited only by the space available and if it is found that a larger sound box is desired a somewhat larger sound box could be used by mounting the sound box angularly on the frame 48.

If it is desired to provide only one amplifier, the structure and apparatus described may be used. The component values of the amplifier may be selected so that the range of sound of the tones or valves of the accordian may be included within the band width of the amplifier.

It should be pointed out that printed-circuit form audio amplifiers are commercially available, which are sufficiently small to be mounted in the interior of an accordian, as shown. The quality and response characteristics of each audio amplifiers may vary in accordance with the price paid.

Thus one form of my invention has been described. It suffices to say that the impedance of the speakers will depend upon the values of the amplifier and if two or more speakers are to be driven by one amplifier, such impedance values of the speakers should be balanced.

The preferred form of my invention includes a second internal amplifier, which is essentially a duplication of the physical parts of the amplifier previously described, except for the speaker or speakers.

As illustrated a second printed circuit board and solid state components, represented by 28, may be mounted as shown, on the wall 30. A second battery 55 and bracket 56 may be mounted to supply power to drive the amplifier. Line 57 represents the harness of the leads connecting the terminals of the second potentiometer 59 and transformer 60 to the components on the printed circuit board. The knob 61 at the end of the shaft of the potentiometer 59 serves for providing manual on/off control and volume control of the second amplifier circuit. Leads 62 and 63 would pass through the wall 30, as indicated by the broken line extensions, and connect with one or more speakers, on the other side of the wall 30, as seen in FIG. 1.

The microphone 65 is connected to transformer 60 via leads 66 and 67.

The preferred form of two complete internally located audio amplifiers, including speakers for each amplifier, anticipates that each amplifier will be a relatively narrow band audio amplifier.

For example, if the audio frequency range of the accordian were, for example, 75 cycles to 6000 cycles, then the frequency response of one audio amplifier may be substantially from 75 cycles per second to 450 cycles per second while the frequency response of the other audio amplifier may be from 425 cycles per second to substantially 6000 cycles per second.

The above frequency response values are presented merely as an example of the sound separation that may be provided by using two audio amplifiers of limited frequency response, which over-lap in frequency response.

By practicing my invention in its preferred form a stereo effect may be obtained in the amplifier sections of the accordian. A balanced sound output of the amplifier sections may be provided with individual band width control over the band width covered by the associated audio amplifier.

Obviously, a fine degree of sound separation and amplification may be provided through the use of limited frequency responsive microphones and/or limited frequency range speakers, used in conjunction with the limited frequency response audio amplifier.

Although the present description has been drawn to and is particularly related to an audio amplifier system within the structure of an accordian, with slight modification other instruments, such as a guitar or bass fiddle, for example, may also be made with a fully portable audio amplifier system.

In the case of a guitar, for example, the transistorized printed circuit component, transformers and microphone pickup may be located within the interior of the body of the instrument. The several components could be mounted with the use of nylon or Teflon stand-off and screws, for example which would reduce to a minimum any suppression of vibration ofthe body, which serves as a sound box. The power supply or battery could be capsule mounted, with the capsule internally located within the body with acces from the external or outer side of the body. The battery could be inserted into the capsule from the outside much like a battery is inserted into an ordinary flashlight. A nylon or Teflon capsule, with the necessary electrical connections is suggested for the materials of the capsule.

In the case of a guitar or bass fiddle, for example, the speaker would be externally located. For a fully portable combination, such as may be desirable in the case of a guitar a speaker could be connected via an ordinary jack-plug connection to the circuitry of the amplifier and hung by means of a clip on the belt of the musician. In this manner two or more speakers could be used.

The on/off and volume control switch could be mounted on the body so that the control knob is manually operable from the external side of the body.

In the case of a bass fiddle, for example, the speaker may also be external and jack-plug connected to the amplifier circuitry. However, the speaker could be clamped or clip mounted to the retractable stud or foot at the base of the bass fiddle when such retractable stud or foot is extended.

Because of the very small size of the components presently available which may be used to make an audio amplifier the presence of such components in the interior of the body of a guitar or bass fiddle have minimal effect on the sound amplification of the body of the instrument, which body serves as a sound box. Location of the microphone is not critical so long as the microphone is in the interior of the body. The use of more than one audio amplifier associated with a guitar or bass fiddle may serve for sound separation but unless micro-miniature audio components are used the bulk of the components would interfere with the efficiency of the body as a sound box.

The use of micro-miniature components is anticipated by the present invention.

While I have described and have shown two forms of my invention, relative to an accordian and have mentioned several ways for providing sound separation in a multi-audio amplifier arrangement thereof and have also mentioned the use of micro-miniature components and arrangements for providing a portable audio amplifier system for other portable musical instruments, obviously more than two complete audio amplifier systems may be employed within the body of a portable musical instrument if desired. The limitation of the use of multiple audio amplifiers is in accordance with the internal space available within the instrument to be electrified. Obviously, other arrangements of my invention may be made, as will be familiar to those skilled in the art, without departing from the spirit of the invention as defined in the appended claims.

I claim:

1. A portable musical instrument including an audio amplifier in the interior thereof, said musical instrument including:
   - a substantially enclosed expandable and contractable section,
   - air intake valves,
   - air exhaust valves,
   - a wall having interior and exterior surfaces forming one part of said expandable and contractable section,
   - a bellows forming another part of said expandable and contractable section,
   - tone valves mounted in said wall between the interior and exterior surfaces,
   - means for actuating the tone valves individually so that air may pass through the tone valves and produce musical tones,
   - a grill covering the tone valves on the exterior surface of said wall and forming an exterior part of the instrument, and having a space between the grill and the exterior surface of said wall,
   - a frame substantially around the periphery of said wall and extending in to said enclosed section and providing a sounding board effect for musical tones produced by said tone valves,
   - a transducer mounted on said interior surface of said wall, and positioned adjacent said frame for receiving musical tones from said frame, a solid state component audio amplifier mounted on said interior of said wall including, a power source mounted on said wall and electrically coupled to said amplifier for driving said amplifier, means coupling said transducer to said audio amplifier for conducting audio frequency signals to said amplifier, switch means for controlling said audio amplifier mounted on said frame with a portion of said switch means extending beyond said frame so the switch may be manually operated from the exterior of said instrument, a second transducer mounted within the space between said grill and the exterior surface of said wall, and means for coupling said second transducer to said audio amplifier for conducting audio frequency signals to said second transducer.

2. A portable musical instrument including an audio amplifier in the interior thereof said musical instrument including;

a substantially enclosed expandable and contractable section, air intake valves, air exhaust valves, a wall having interior and exterior surfaces forming one part of said expandable and contractable section, a bellows forming another part of said expandable and contractable section, tone valves mounted in said wall between the interior and exterior surfaces, means for actuating the tone valves individually so that air may pass through the tone valves and produce musical tones, a grill covering the tone valves on the exterior surface of said wall and forming an exterior part of said instrument, and having a space between the grill and the exterior surface of said wall, a frame substantially around the periphery of said wall, and extending into said enclosed section, a sound box mounted on said frame for amplifying musical tones produced by said tone valves, a transducer mounted on said interior surface of said wall and positioned adjacent to said sound box for receiving musical tones amplified by said sound box, a solid state audio amplifier mounted on said interior of said wall including, a power source mounted on said wall and electrically coupled to said amplifier for driving said amplifier, means coupling said transducer to said audio amplifier for conducting audio frequency signals to said amplifier, a second transducer mounted within the space between said grill and the exterior surface of said wall, and means for coupling said second transducer to said audio amplifier for conducting audio frequency signals to said second transducer.

3. A portable musical instrument including audio amplifier means in the interior thereof said portable instrument including;

a substantially enclosed expandable and contractable section, air intake valves, air exhaust valves, a wall having interior and exterior surfaces forming one part of said expandable and contractable section, a bellows forming another part of said expandable and contractable section, tone valves mounted in said wall between the interior and exterior surfaces, means for actuating the tone valves individually so that air may pass through the tone valves and produce musical tones, a frame substantially around the periphery of said wall and extending into said enclosed section providing a sounding board effect for musical tones produced by said tone valves, a first limited frequency audio amplifier mounted substantially within said enclosed section including, solid state electronic components coupled in circuitry for amplifying a limited band of audio frequency electric signals, a battery coupled to the circuitry of said first amplifier for driving said first amplifier, a first transducer for converting audio frequency signals into corresponding electric signals, said first transducer mounted adjacent to said frame for receiving musical tones from said frame, means for coupling said first transducer to said circuitry for conducting electric signals to said circuitry of said first amplifier, a second transducer for converting electric signals into corresponding audio frequency signals, mounted on the exterior of said wall and coupled to said circuitry of said first amplifier for receiving electric sginals amplified by said circuitry, a second limited frequency audio amplifier mounted substantially within said enclosed section including, second solid state electronic components coupled in circuitry for amplifying a limited band of audio frequency electric signals, a second battery coupled to the circuitry of said second amplifier for driving said second amplifier, a third transducer for converting audio frequency signals into corresponding electric signals, said third transducer mounted adjacent to said frame for receiving musical tones from said frame, means for coupling said third transducer to said circuitry of said second amplifier for conducting electric signals to said circuitry of said amplifier, and a fourth transducer for converting electric signals into corresponding audio frequency signals, mounted on the exterior of said wall and coupled to said circuitry of said second amplifier for receiving electric signals amplified by the last mentioned circuitry.

4. A portable musical instrument as in claim 3 and in which the band of audio frequency electric signals amplified by said first limited frequency amplifier includes a band width, the lowest frequency of which is substantially lower than the frequency of the lowest tone produced by said instrument and the highest frequency of which approximates the frequency of the mid-tone range of the said instrument and the band of audio frequency electric signals amplified by said second limited frequency amplifier includes a band width the lowest frequency of which is substantially lower than the highest frequency of the band of the said first amplifier and the highest frequency of which is substantially higher than the frequency of the highest tone produced by said instrument.

5. A portable musical instrument including audio amplifier means in the interior thereof, said instrument including;

a substantially enclosed expandable and contractable section, air intake valves, air exhaust valves, a wall having interior and exterior surfaces forming one part of said expandable and contractable section, a bellows forming another part of said expandable and contractable section, tone valves mounted in said wall between the interior and exterior surfaces, means for actuating the tone valves individually so that air may pass through the tone valve and produce musical tones, a frame substantially around the periphery of said wall and extending into said enclosed section, a sound box mounted on said frame for amplifying musical tones produced by said tone valves, a first limited frequency audio amplifier mounted substantially within said enclosed section including, solid state electronic components coupled in circuitry for amplifying a limited band of audio frequency electric signals, a battery coupled to the circuitry of said first amplifier for driving said first amplifier, a first transducer for converting audio frequency signals into corresponding electric signals, said first transducer mounted adjacent said sound box for receiving musical tones amplified by said sound box, means for coupling said first transducer to said circuitry of said first amplifier for conducting electric signals to said circuitry of said first amplifier, a second transducer for converting electric signals into corresponding audio frequency signals, mounted on the exterior of said wall and coupled to said circuitry of said first amplifier for receiving electric signals amplified by said circuitry, a second limited frequency audio amplifier mounted substantially within said enclosed section including, second solid state electronic components coupled in circuitry for amplifying a limited band of audio frequency electric signals, a second battery coupled to the circuitry of said second amplifier for driving said second amplifier, a third transducer for converting audio frequency signals into corresponding electric signals, said third transducer mounted adjacent said sound box for receiving musical tones amplified by said sound box, means for coupling said third transducer to said circuitry of said second amplifier for conducting electric signals to said circuitry of said amplifier and, a fourth transducer for converting electric signals into corresponding audio frequency signals, mounted on the exterior of said wall and coupled for receiving electric signals amplified by the circuitry of said second amplifier.

6. A portable musical instrument as in claim 5 and in which the lowest frequency of the band of frequencies amplified by said first limited frequency audio amplifier is substantially lower than the frequency of the lowest tone produced by said instrument and the highest frequency of the band of frequencies amplified by said first amplifier approximates the frequency of the mid-tone range of said instrument and the lowest frequency of the band of frequencies amplified by said second limited frequency audio amplifier is substantially lower than the highest frequency amplified by said first amplifier and the highest frequency of the band of frequencies amplified by said second amplifier is substantially higher than the frequency of the highest tone produced by said instrument.

References Cited by the Examiner

UNITED STATES PATENTS

| | | | |
|---|---|---|---|
| 2,658,420 | 11/1953 | Pompili | 84—376 |
| 2,716,370 | 8/1955 | Sano | 84—376 X |
| 2,798,397 | 7/1957 | Frigo et al. | 84—376 X |
| 3,064,515 | 11/1962 | Markowitz | 84—1 |
| 3,084,583 | 4/1963 | Anderson | 84—1.16 |
| 3,085,460 | 4/1963 | Edwards | 84—267 |
| 3,175,448 | 3/1965 | Cardoza | 84—1.27 |

FOREIGN PATENTS

| | | |
|---|---|---|
| 1,160,069 | 2/1958 | France. |
| 1,379,666 | 10/1964 | France. |

RICHARD B. WILKINSON, *Primary Examiner.*

STEPHEN J. TOMSKY, *Examiner.*

C. M. OVERBEY, *Assistant Examiner.*